United States Patent [19]
Greene

[11] 3,732,729
[45] May 15, 1973

[54] SPEED SENSOR

[76] Inventor: Norman D. Greene, Route 1, Box 148, Del Mar, Calif. 92014

[22] Filed: Aug. 19, 1971

[21] Appl. No.: 172,997

[52] U.S. Cl. .................................. 73/181, 73/204
[51] Int. Cl. .............................................. G01c 21/10
[58] Field of Search ....................... 73/181, 204, 359

[56] References Cited

UNITED STATES PATENTS

| 2,540,822 | 2/1951 | Hastings | 73/204 |
| 3,587,312 | 6/1971 | McMurtrie et al. | 73/204 |

FOREIGN PATENTS OR APPLICATIONS

| 312,522 | 5/1919 | Germany | 73/204 |

Primary Examiner—Donald O. Woodiel
Attorney—Richard K. Macneill

[57] ABSTRACT

A speed sensor for mounting on the hull of a boat for sensing the water speed of the boat in which a bank of semi-conductor thermal junction units are mounted in a co-planer thermopile relationship being electrically connected serially; a heating pad mounted on one surface of the co-planer thermopile; and a copper plate juxtaposed to the heating pad and the opposite side of the co-planer thermopile.

3 Claims, 2 Drawing Figures

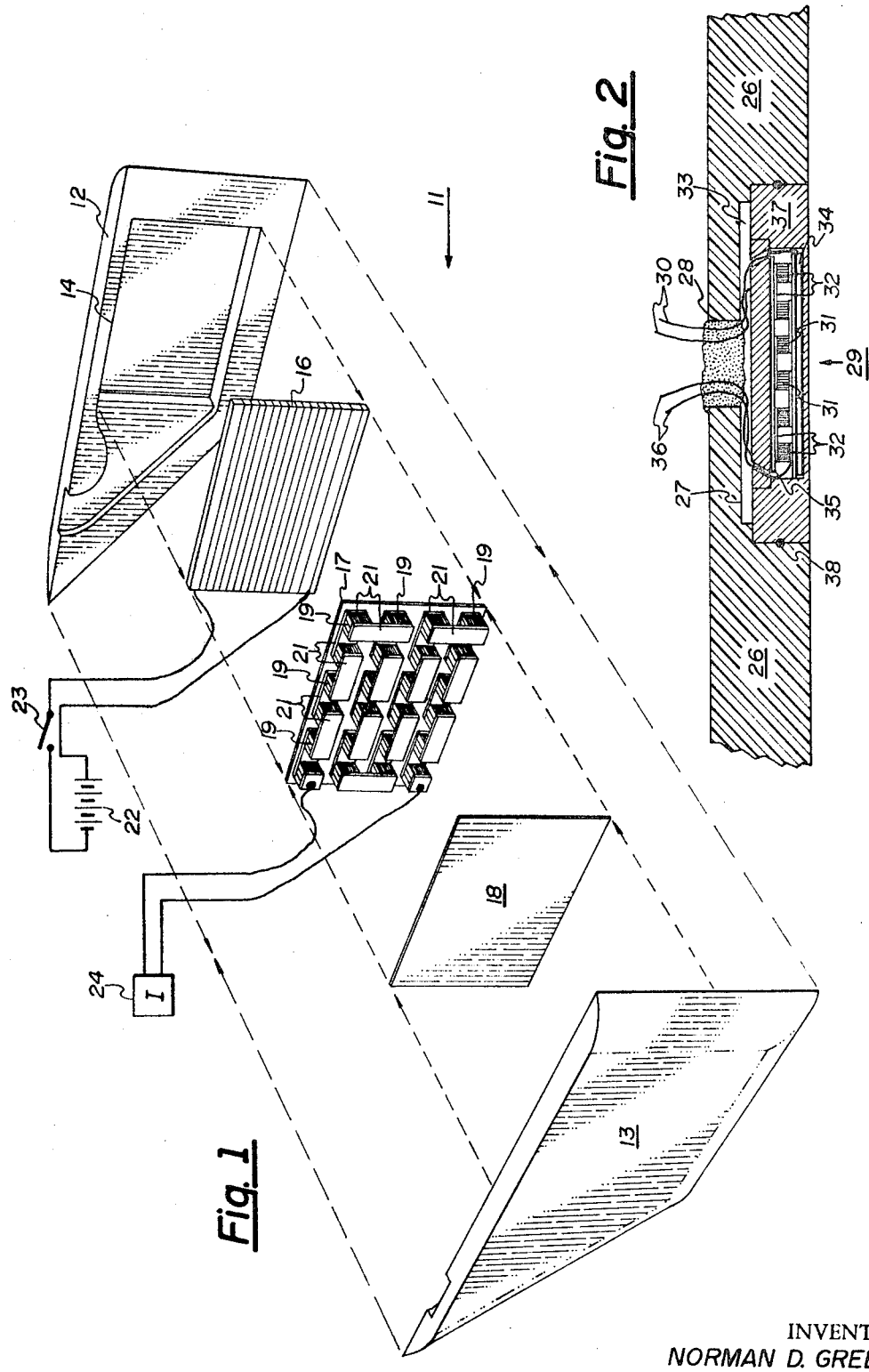

SPEED SENSOR

BRIEF DESCRIPTION OF THE INVENTION

The present invention relates to a speed sensor and more particularly to a speed sensor utilizing a co-planer thermopile.

According to the invention a speed sensor is provided wherein a plurality of semi-conductor thermal junctions are mounted in a co-planer relationship with a heater on one side thereof. A heat conductive plate such as copper can be mounted on the other side of the heater pad and on the opposite side of the thermopile forming a thin sandwich. When power is applied to the heater the thermopile output will be maximum and if the entire unit is attached to the hull of the boat, for example, and the boat is moving through an aqueous medium, the heat will be carried away from the unit in an exponential relationship with the water speed. Hence, as the boat moves faster the output from the thermopile will drop due to the convective heat transmission into the medium and an indicator can be coupled to the thermopile calibrated directly in speed.

An object of the present invention is the provision of thermopile speed sensor having a high output voltage.

Another object of the invention is the provision of a thermopile speed sensor utilizing semi-conductor thermal junctions.

A further object of the invention is the provision of a thermopile speed sensor which is co-planer.

Yet another object of the invention is the provision of a thermopile speed sensor which utilizes indirect heating.

A still further object of the invention is the provision of a thermopile speed sensor which is inexpensive to manufacture and install, and extremely reliable in operation.

Other objects and many of the attendant advantages will be readily appreciated as the same becomes better understood by reference to the following detailed description when considered in connection with the accompanying drawings in which like reference numerals designate like parts throughout the FIGS. thereof and wherein:

FIG. 1 is an exploded view in perspective of one embodiment of the present invention; and FIG. 2 is a side sectional view of another embodiment of the present invention insidto.

DETAILED DESCRIPTION OF THE DRAWING

Referring to FIG. 1, a thermopile sensor is shown generally at 11 having heat conductive metal plates 12 and 13. Metal plate 12 has a recess 14 dimensioned for receiving a heating pad 16 and electrically insulative and thermally conductive sheets 17 and 18. Sheet 18 is typically constructed of berryllia. Insulative sheet 17 carries a plurality of semi-conductor thermal junctions 19 which are coupled by shorting bars 21 in a serial relationship. Heating pad 16 is powered by an electrical source 22 through switch 23. The output of the thermopile comprising thermal junctions 19 is coupled to indicator 24.

Referring to FIG. 2, a ship's hull is shown at 26 having a recess 27 communicating with aperture 28. A sensing unit is shown generally at 29 mounted within and received by recess 27. Sensor unit 29 comprises a plurality of thermal junctions 31 coupled in a serial relationships by buses 32 and having an output taken at leads 30. A heating pad 34 is coupled to input leads 36 and is mounted on one surface of co-planer thermal junctions 31. An air gap 33 insulates the entire sensor from hull 26. The entire thermopile unit is contained in heat conductive unit package 37 which is held within recess 27 and sealed by O-ring 38. Electrically insulative and heat conductive sheet 35 is disposed between thermal junctions 31 and unit package 37, which is typically constructed of copper.

OPERATION

Referring back to FIG. 1, a fin type of speed sensor is shown which would be mounted to the bottom of a boat's hull at right angles thereto and parallel to the water flow to offer negligible resistance to the aqueous medium in which it is traveling. As the heater 16 heats up the thermal junction 19, an output voltage will be seen at output indicator 24. At zero velocity there is a maximum temperature resulting in the hottest junctions and the maximum output at indicator 24. As the speed of the sensor increases through the water the temperature will decrease resulting in less output at indicator 24. It has been found that the output decreases exponentially with an increase in speed. Indicator 24, which can be any conventional electrical indicator, can then be calibrated directly in speed units.

Referring back to FIG. 2, a flush mounting is shown utilizing the identical principle as the fin mount of FIG. 1. Here the convective surface is flush with the hull of the ship. This type of mounting would be useful in an aircraft and very high speed boats.

A typical semi-conductor thermal junction can utilize semi-conductors such as bismuth telluride P-N type or sillicon P-N type. Typical heat conductive plates would be copper forming a heat sink completely enveloping the thermopile.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A speed sensor comprising:
   a co-planer semi-conductor thermopile;
   a heating pad mounted on one surface of said co-planer thermopile; and
   a heat conductive package completely containing said thermopile and heating pad, said thermopile and heating pad being mounted to an outside surface of a vehicle and said thermopile having an output adapted for coupling to an indicating means.

2. The speed sensor of claim 1 wherein:
   said heat conductive package is dimensioned for being received by a recess in a submerged surface of a boat hull leaving an air gap between the top surface of said package and the top surface of said recess.

3. The speed sensor of claim 1 wherein:
   said heating pad and thermopile are adapted to be mounted to a bottom surface to the hull of a boat at right angles thereto and parallel to water flow.

* * * * *